Feb. 13, 1962   L. GELFAND   3,020,608
FRANGIBLE MOLD
Filed July 13, 1959   2 Sheets-Sheet 1
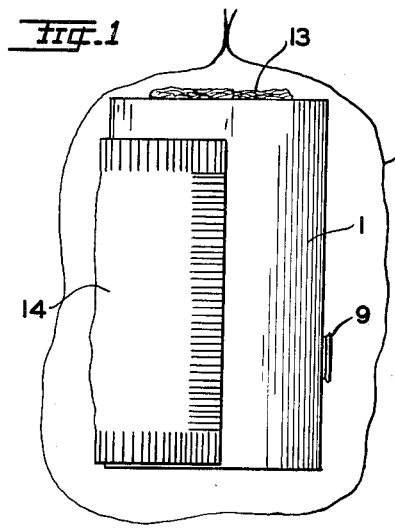
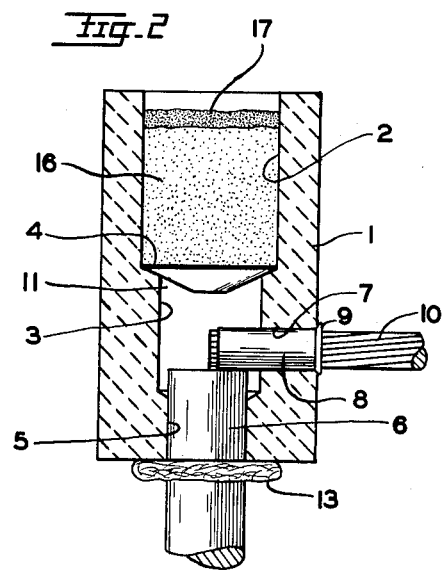
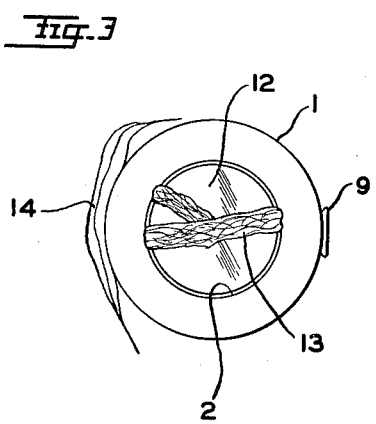
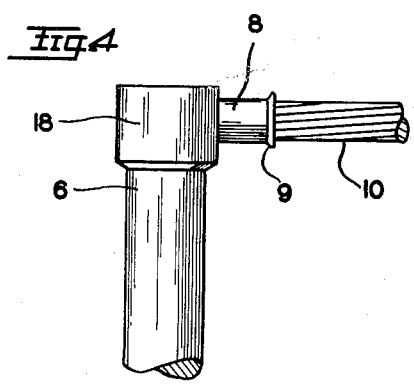
INVENTOR.
LEONARD GELFAND
BY
Oberlin, Maky & Donnelly
ATTORNEYS Feb. 13, 1962  L. GELFAND  3,020,608
FRANGIBLE MOLD
Filed July 13, 1959  2 Sheets-Sheet 2
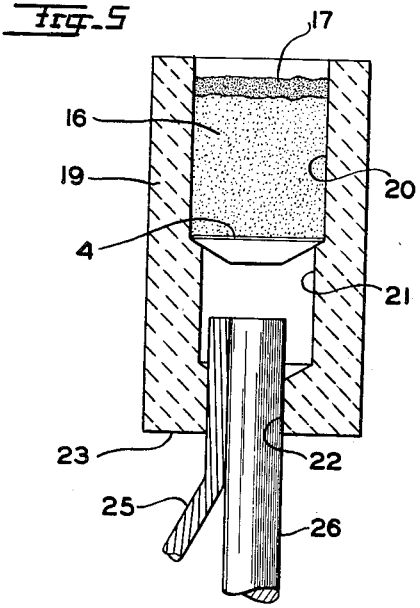
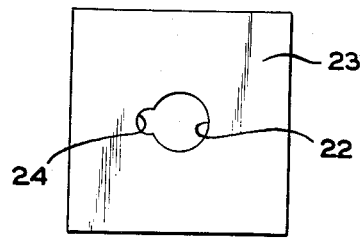
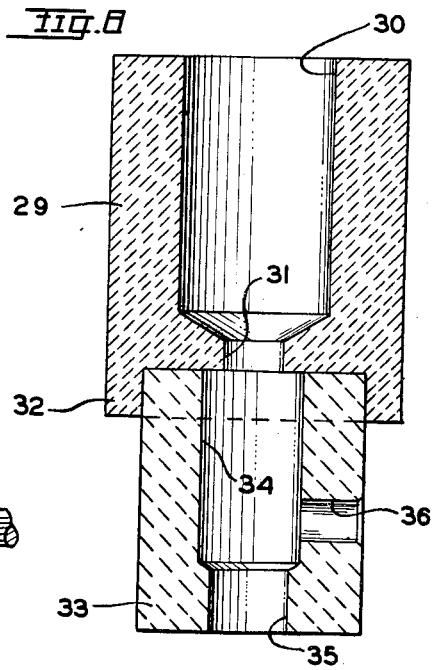
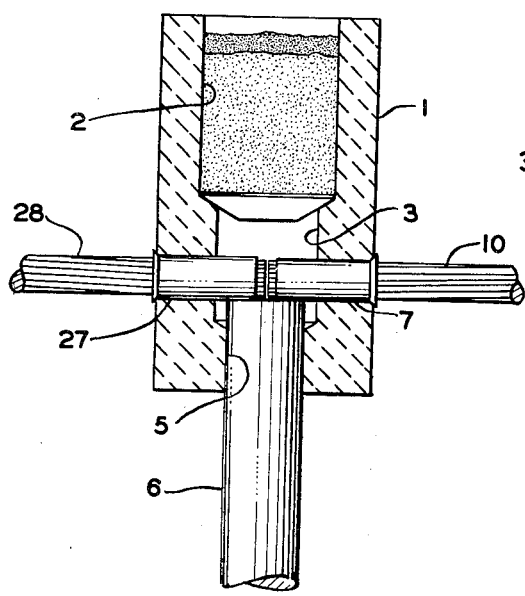
INVENTOR.
LEONARD GELFAND
BY
Oberlin, Maky & Donnelly
ATTORNEYS United States Patent Office 3,020,608
Patented Feb. 13, 1962

3,020,608
FRANGIBLE MOLD
Leonard Gelfand, South Euclid, Ohio, assignor to Erico Products, Inc., Cleveland, Ohio, a corporation of Ohio
Filed July 13, 1959, Ser. No. 826,710
4 Claims. (Cl. 22—116)

This invention relates as indicated to a novel frangible mold particularly adapted for use with metal producing exothermic reaction mixtures such as those disclosed in U.S. Patent 2,870,499 to Donald J. Burke, for example.

As shown in such above-identified patent, rather elaborate crucible and mold combinations have been provided in the past for the cast welding of metal parts by means of a charge of highly heated molten metal produced by an exothermic (ordinarily alumino-thermic) reaction. Such mold and crucible combinations have been made of graphite which is generally suitable for the intended purpose but involves some incidental problems. A small amount of moisture may be absorbed by or adsorbed on the graphite crucible requiring preheating of the crucible if proper reaction of the exothermic mixture is to take place. Inasmuch as such graphite molds and crucibles are rather expensive, they are intended to be used repeatedly and consequently require careful cleaning of the crucible and sprue after each use to ensure proper functioning. There are many occasions when it becomes necessary to make a repair in the field where only one or two welds may be required, and under such circumstances it is an expensive nuisance to have to maintain stocks of such relatively elaborate welding equipment at a number of different locations.

It is accordingly an important object of my invention to provide a disposable mold and crucible combination which will be relatively inexpensive and is adapted normally to be discarded after but a single use.

Another object is to provide such mold and crucible combination as part of a novel package including the other essentials for performance of the welding operation, all preassembled in a manner to expedite performance of the operation in the field.

A further object is to provide a novel method of welding and particularly of welding conductor cables to ground rods and the like which is quick and efficient and produces a strong, sound weld.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 shows a novel airtight package in accordance with my invention containing a frangible disposable fire clay mold and crucible combination packaged in a novel manner with the other materials essential to the performance of the welding operation;

FIG. 2 is a vertical transverse section through such combined mold and crucible shown mounted upon the upper end of a ground rod or the like and with the end of a copper conductor cable inserted into the mold cavity in preparation for ignition of the exothermic reaction charge and production of the weld;

FIG. 3 is a top plan view of the contents of the FIG. 1 package;

FIG. 4 shows the completed weld after ignition of the exothermic reaction charge and destruction of the enclosing mold;

FIG. 5 shows another modification of the FIG. 2 embodiment;

FIG. 6 is a bottom view of the apparatus of FIG. 5;

FIG. 7 shows still another modification of the FIG. 2 embodiment; and

FIG. 8 shows a two-piece construction otherwise similar to that of FIG. 2.

Referring now more particularly to FIGS. 1–3 inclusive of the drawing, a preferred embodiment of my invention there illustrated may comprise a cylindrical fire clay or ceramic mold and crucible combination 1 having an upper cylindrical crucible cavity 2 therein and a lower cylindrical mold cavity 3 of somewhat reduced diameter in communication with the bottom of such crucible, an annular step or shoulder 4 separating the two cavities. A third co-axial cylindrical opening 5 of somewhat smaller diameter than mold cavity 3 extends from the bottom of such latter cavity to the bottom of the fire clay cylinder 1 providing entry for the upper end 6 of a metal ground rod or the like.

A lateral passage 7 extends through the wall of cylinder 1 in communication with the interior of mold cavity 3 and is adapted to receive a tubular copper sleeve 8 fitted therewithin and having an outer flaring lip 9 limiting inward movement of such sleeve as well as facilitating subsequent insertion of the end portion of a stranded copper conductor cable 10 or the like. As best shown in FIG. 2, such tubular sleeve 8 will desirably project sufficiently within mold cavity 3 to engage and serve as a registering stop for an article such as ground rod 6 inserted through the bottom opening 5 into the mold cavity.

The package also includes a thin dished sheet metal disc 11, ordinarily preferably of steel, seated on annular shoulder 4 and separating the crucible portion 2 from the mold cavity 3. Within such crucible 2 and resting against such disc 11 is a cylindrical cartridge 12 ordinarily of cardboard or plastic containing the exothermic reaction material including an appropriate ignition or starter powder in the bottom thereof. This cartridge may desirably be of the type described in some detail in the copending application for U.S. Letters Patent of Henry R. Leuthy and Leonard Gelfand, Serial No. 810,614, filed May 4, 1959, entitled "Cartridge for Exothermic Reaction Material."

An elongated twisted wire chenille carrying member 13 such as a pipe cleaner (and hereafter for convenience referred to as a "pipe cleaner") is folded over the top of the cartridge 12 with portions tucked down between the outer side wall of such cartridge and the inner wall of crucible 2 to assist in preventing rattling of the cartridge therein. As explained below, such pipe cleaner also serves a further function during performance of the welding operation. A small porous packet 14 of a suitable desiccant may be placed with the above-described assembly within an outer sealed polyethylene bag 15 to provide a package in which both the mold and crucible combination and the exothermic reaction mixture are thoroughly protected from the weather. Such packages may be stored for long periods of time without deterioration and are immediately available with all necessary ingredients and components for performance of emergency welding operations in the field.

When it is desired to perform such welding operation as, for example, the cast welding of the end of a stranded copper conductor cable 10 to the upper end 6 of a metal ground rod, the outer bag 15 is opened and discarded together with the desiccant packet 14. The cylinder 1 is then supported on the upper end 6 of the ground rod by inserting the latter through opening 5 until it engages the inner projecting portion of tubular sleeve 8. The pipe cleaner 13 is tightly twisted about rod 6 directly beneath cylinder 1 to assist in supporting the latter and also to assist in preventing escape of molten metal from the mold cavity during performance of the welding operation. The cartridge 12 is removed from crucible 2, opened, and inverted into such crucible to deposit the metal producing exothermic reaction mixture 16 therein with a small layer of the ignition or starting powder 17 on top, the whole being supported by the dished steel disc 11. The stranded copper conductor cable 10 is inserted through tubular sleeve 8 until the extreme end of such cable preferably projects slightly from the inner end of the sleeve approximately centrally of the mold cavity 3. It will be understood that the ground rod and cable should both be clean and dry to ensure the making of a good weld. The opening 5 will preferably be dimensioned to fit the upper end of rod 6 reasonably snugly to assist in supporting cylinder 1 thereon and the pipe cleaner 13 may be twisted about the upper portion of rod 6 prior to placing such cylinder on rod 6 so that it will snugly engage the bottom of the cylinder as the cylinder is pushed down on the rod.

Upon igniting the starting powder 17 by means of a flint gun or the like, the exothermic reaction is initiated and the highly heated molten metal (ordinarily copper or copper alloy) melts through the thin steel disc 11 and is discharged into mold cavity 3 enveloping the extreme upper end of the ground rod and the inner ends of cable 10 and sleeve 8, the level of the weld metal within cavity 3 preferably being slightly above the upper surface of tubular sleeve 8. In view of the small size of the molten metal charge, it ordinarily solidifies quite rapidly, and the operator thereupon will remove cylinder 1 by striking it with several lateral blows of a hammer. The extreme heat of the exothermic reaction quite frequently produces minute or incipient cracks in the side of cylinder 1 considerably facilitating such subsequent removal of the latter from the welded connection 18. The organic material of the pipe cleaner tends to carbonize from the high temperature and adheres to the rod in a manner assisting in preventing molten weld metal from seeping down such rod through passage 5. It is, of course, possible to leave cylinder 1 in place on the connection if desired, but it is ordinarily very much preferred to remove such cylinder both to leave a neater appearing joint and also to permit inspection of the finished weld.

Inasmuch as the mold and crucible combination 1 may be formed of relatively inexpensive material such as fire clay or other ceramic material, it is entirely economical thus to destroy the mold and crucible after but a single use, and it is accordingly not necessary to provide split molds and the like as have frequently been required in the past in order to remove the mold from the finished welded connection. As a consequence, the usual flash which is frequently produced between the mating mold sections is entirely avoided and a neater appearing weld produced. All need of cleaning the mold and crucible for reuse or of preheating the same prior to use is avoided.

The frangible cylindrical body 1 may be of fired fire clay or other refractory material such as bonded calcined dolomite, sand bonded with phenol-formaldehyde resin, ceramic material and the like. Such unitary refractory body 1 is preferably formed with cylindrical bores 2, 3 and 5 of successively smaller diameters. The same mold assembly may be used with several sizes of rods 6 and cables 10, the molten weld metal solidifying before any large amount can seep through openings 5 and 7. The desiccant, if such is employed, may be silica gel. It will be appreciated that a variety of different metal producing exothermic reactions may be employed to produce the molten weld metal. A particularly satisfactory composition for many purposes is as follows:

| | Parts by weight |
|---|---|
| Copper scale (roasted) | 72.9 |
| Copper-aluminum alloy, crushed (50% copper, 50% aluminum) | 18.3 |
| Calcium fluoride | 2.1 |
| Calcium silicon | 2.1 |
| Zinc oxide | 0.6 |
| Tin metal | 4.0 |

A suitable starting powder mix is as follows:

| | Parts by weight |
|---|---|
| Copper oxide scale | 20.0 |
| Copper-aluminum alloy | 5.0 |
| Red phosphorus | 5.0 |
| Metallic aluminum powder | 7.5 |
| Black copper oxide | 10.0 |

It will, of course, be appreciated that the particular exothermic reaction mixtures employed do not per se constitute any part of the present invention. I have provided a novel welding package which is complete in all its components and adapted to be stored or transported without deterioration. The mold may be prepared for use in a minimum of time and removed by fragmenting the same, being of such inexpensive construction that there is no need to clean and reuse it. At the same time, superior results are obtained inasmuch as it is unnecessary to utilize mating mold parts which tend to permit escape of metal, formation of flash, etc.

Referring now more particularly to FIGS. 5 and 6 of the drawing, the embodiment of the invention there illustrated comprises a frangible ceramic mold block 19 formed to provide an upper crucible 20 communicating at its lower end with a mold cavity 21 in the same manner as the embodiment shown in FIG. 2. Instead of providing a lateral passage or passages such as passage 7, however, for the introduction of the cable end portion, the opening 22 in the bottom 23 of the mold block is provided with an adjoining lateral extension 24 shaped to receive the cable 25 inserted therethrough parallel to and lying closely against rod 26 inserted through larger opening 22. It will be seen that the molten metal produced by the exothermic reaction will surround and weld together the upstanding end portions of such cable and rod.

Referring now to FIG. 7 of the drawing, the embodiment of the invention there shown corresponds exactly to that of FIG. 2 except that another opening or passage 27 is provided through the wall of the mold cavity 3 preferably diametrically opposite to passage 7 so that the sleeved end portion of another cable 28 may be introduced therethrough to be cast welded to the upper end of rod 6 simultaneously with the end of cable 10. In each of the last above-described forms of the apparatus, the same will, of course, be removed by fragmentation upon completion of the weld.

While the above-described embodiments of the invention greatly facilitate operations in the field, it is nevertheless sometimes desirable and economic to employ a separable crucible block 29 which may be of graphite, for example, having the crucible cavity 30 hollowed therein with a sprue 31 leading through the underside thereof. Such crucible block 29 is provided with a peripheral downwardly extending lip portion 32 adapted to encompass and fit the upper portion of a frangible ceramic mold 33 having a mold cavity 34 in communication with sprue 31. A bottom aperture or passage 35 corresponding to passage 5 of the FIG. 2 embodiment is provided for insertion of a rod or the like to be welded, and one or more lateral passages such as 36 may likewise be provided for insertion of a cable or the like into cavity 34. It will be seen that with this form of apparatus the graphite crucible block 29 may be removed and preserved for further use while the frangible ceramic mold 33 is destroyed by fragmentation to remove it from the cast weld. Crucible block 29 may, of course, be of other refractory material but graphite is particularly suitable for the purpose.

It will be seen from the foregoing that I have provided a frangible refractory mold and cast welding assembly which is both very inexpensive and designed to facilitate and expedite operations in the field.

Other modes of applying the principle of the invention may be employed, change being made as regards the details described, provided the features stated in any of the following claims or the equivalent of such be employed.

I therefore particularly point out and distinctly claim as my invention:

1. A small, portable, thin walled mold for cast welding connections with molten metal produced by an exothermic reaction comprising a unitary cylindrical refractory body having a large cylindrical bore opening to one end thereof, a small co-axial cylindrical bore opening to the other end thereof, an intermediate co-axial bore of intermediate diameter opening into such respective end bores and forming a mold cavity, and a small lateral passage through the wall of such mold cavity having a tubular sleeve inserted therein projecting into such mold cavity adapted for entrance of one of the members to be welded, said small bore being adapted for entrance of the other member to be welded thereto when said mold is placed thereon, and said large bore being adapted to serve as a crucible for such metal-producing exothermic reaction.

2. The mold of claim 1, wherein said body is of fired fire clay.

3. A small, portable, thin walled frangible mold for cast welding connections with molten metal produced by an exothermic reaction comprising a unitary cylindrical refractory body having a large cylindrical bore opening to one end thereof, a small coaxial cylindrical bore opening to the other end thereof, and an intermediate coaxial bore of intermediate diameter opening into such respective end bores and forming a mold cavity, said small bore being adapted for entrance of one of the members to be welded, and having a notch in its side running the entire length thereof, said notch being adapted to receive and fit a smaller elongated member inserted therein in lateral contact with such aforesaid member when said mold is placed thereon.

4. A small, portable, thin walled frangible mold for cast welding connections with molten metal produced by an exothermic reaction comprising a unitary cylindrical refractory body having a large cylindrical bore opening to one end thereof, a small coaxial cylindrical bore opening to the other end thereof, an intermediate coaxial bore of intermediate diameter opening into such respective end bores and forming a mold cavity, and at least one small lateral passage through the wall of such mold cavity, each such passage and small bore being adapted for entrance of one of the members to be welded, and such large bore being adapted to serve as a crucible for such metal-producing exothermic reaction.

References Cited in the file of this patent

UNITED STATES PATENTS

| | | |
|---|---|---|
| 878,869 | Cole | Feb. 11, 1908 |
| 1,100,132 | Hall | June 16, 1914 |
| 1,549,461 | Deppeler | Aug. 11, 1925 |
| 1,607,508 | Bottrill | Nov. 16, 1926 |
| 1,642,484 | Burgett | Sept. 13, 1927 |
| 2,119,056 | Peterson | May 31, 1938 |
| 2,276,823 | Cadwell | Mar. 17, 1942 |
| 2,321,731 | Bouton | June 15, 1943 |
| 2,464,210 | Cadwell | Mar. 15, 1949 |
| 2,481,599 | Kinzel | Sept. 13, 1949 |
| 2,870,498 | Rejdak | Jan. 27, 1959 |

FOREIGN PATENTS

| | | |
|---|---|---|
| 211,578 | Australia | Feb. 21, 1957 |